US007665362B2

(12) United States Patent
Sadri

(10) Patent No.: US 7,665,362 B2
(45) Date of Patent: Feb. 23, 2010

(54) SYSTEMS, METHODS AND APPARATUS FOR NON-DISRUPTIVE AND NON-DESTRUCTIVE INSPECTION OF METALLURGICAL FURNACES AND SIMILAR VESSELS

(75) Inventor: Afshin Sadri, Woodbridge (CA)

(73) Assignee: Hatch Ltd., Mississauga, Ontario (CA)

( * ) Notice: Subject to any disclaimer, the term of this patent is extended or adjusted under 35 U.S.C. 154(b) by 87 days.

(21) Appl. No.: 11/962,896

(22) Filed: Dec. 21, 2007

(65) Prior Publication Data

US 2008/0092658 A1 Apr. 24, 2008

Related U.S. Application Data

(62) Division of application No. 11/061,630, filed on Feb. 22, 2005, now abandoned.

(51) Int. Cl.
*G01N 29/06* (2006.01)

(52) U.S. Cl. .............................. 73/597; 73/600; 73/602

(58) Field of Classification Search ........... 73/222–803, 73/813
See application file for complete search history.

(56) References Cited

U.S. PATENT DOCUMENTS

| | | | | |
|---|---|---|---|---|
| 2,450,159 | A | | 9/1948 | Pickslay |
| 2,632,862 | A | | 3/1953 | Stoltz |
| 3,767,832 | A | | 10/1973 | Bennett |
| 4,207,771 | A | * | 6/1980 | Carlos et al. .................. 73/587 |
| 4,358,953 | A | | 11/1982 | Horiuchi et al. |
| 4,494,408 | A | * | 1/1985 | DeLacy ....................... 73/587 |
| 4,607,374 | A | | 8/1986 | Inagaki et al. |
| 4,872,345 | A | | 10/1989 | Dicks |
| 5,040,419 | A | | 8/1991 | Allaire et al. |
| 5,101,162 | A | * | 3/1992 | Webster et al. .............. 324/618 |
| 5,890,805 | A | | 4/1999 | Groth et al. |
| 5,983,701 | A | | 11/1999 | Hassani et al. |
| 6,792,358 | B2 | | 9/2004 | Rojas et al. |
| 7,174,787 | B2 | * | 2/2007 | Sadri et al. .................... 73/597 |
| 7,327,637 | B2 | * | 2/2008 | Chambers et al. ........... 367/140 |
| 7,458,266 | B2 | * | 12/2008 | Beard et al. ................... 73/579 |
| 2003/0145659 | A1 | * | 8/2003 | Momayez et al. ............. 73/800 |
| 2004/0177692 | A1 | | 9/2004 | Sadri et al. |
| 2006/0186585 | A1 | | 8/2006 | Sadri |

FOREIGN PATENT DOCUMENTS

| | | |
|---|---|---|
| CA | 2460901 | 9/2004 |
| CA | 2437323 | 2/2005 |
| EP | 0 429 774 | 5/1991 |

* cited by examiner

*Primary Examiner*—Helen C. Kwok
(74) *Attorney, Agent, or Firm*—Bereskin & Parr LLP/S.E.N.C.R.L., s.r.l.

(57) ABSTRACT

Some embodiments of the present invention provide systems, methods and apparatus for more accurately determining the thickness of a refractory lining included in an operating metallurgical furnace. Specifically, in some embodiments a transient propagated stress wave is used to determine the condition of a refractory lining, and additionally, provide a systematic way to include the affect that temperature has on the velocity of a compressive wave through a heated refractory material and/or accretions. As identified in aspects of the present invention, and contrary to the common understanding in the art, the velocity of a stress wave, at each frequency and in a refractory material, is not necessarily constant over a temperature range. In accordance with aspects of some specific embodiments of the invention, a scaling factor α can be calculated for each refractory material to adjust for the presumed velocity of the stress wave through each refractory material.

16 Claims, 7 Drawing Sheets

SYSTEMS, METHODS AND APPARATUS FOR NON-DISRUPTIVE AND NON-DESTRUCTIVE INSPECTION OF METALLURGICAL FURNACES AND SIMILAR VESSELS

FIELD OF THE INVENTION

The invention relates to ways of inspecting metallurgical furnaces and the like, and, in particular to systems, methods and apparatus, for non-disruptive and non-destructive inspection of metallurgical furnaces and similar vessels.

BACKGROUND OF THE INVENTION

A typical metallurgical furnace is a container having side-walls with a multi-layer construction. The outer layer is typically a steel shell provided for structural support. The inner layer includes a refractory lining, constructed from one or more layers of refractory bricks, that is provided to shield the outer steel shell from molten materials and aggressive chemicals inside the furnace. In some furnaces, a cooling layer is also provided between the outer steel shell and the refractory lining to prevent excessive heat transfer from the refractory lining to the outer steel shell. In some furnace designs, the layers of brick and/or cooling elements are set in place with a soft sand-like material that solidifies during the operation of the furnace.

During the operation of a metallurgical furnace, the refractory lining is deteriorated by mechanical and thermal stress in addition to chemical corrosion resulting in a loss of overall refractory lining thickness. As the refractory lining deteriorates molten materials and aggressive chemicals penetrate into widening spaces in and/or between refractory bricks leading to delamination (i.e. separation) of the layers in the refractory lining. Deterioration of the refractory lining ultimately leads to structural failures that may cause the outer steel shell to be exposed to molten materials and aggressive chemicals inside the furnace. Moreover, if the molten materials and aggressive chemicals reach the outer steel shell there is an imminent risk of severe injury to personnel working near the furnace, because the outer steel shell is not capable of reliably holding back the molten materials and aggressive chemicals from inside the furnace. Loss of heat transferability and conductivity are also known to occur as results of the deterioration of the refractory lining.

Another mode of refractory lining deterioration, common in furnaces that include water-cooled elements, is hydration of the refractory lining. Under certain temperatures, water that has leaked from a cooling element can react with the refractory bricks causing expedited deterioration of the refractory lining. In particular, magnesium (MgO) based refractory bricks are susceptible to this mode of failure.

It is desirable to regularly check the thickness of the refractory lining, as well as inspect the refractory lining for defects such as cracking, delaminations, accretions and other build-up. Making a reliable and accurate assessment of the refractory lining thickness is difficult to do without first emptying the furnace and shutting down the industrial process in which the furnace is involved. Shutting down a metallurgical furnace for routine inspection is costly and operators try to make use of inspection methods that can be employed while the furnace is operating. However, the hostile working-environment, that the furnaces are included in, skews the measurements made. For example, extremely high temperatures in the furnaces, vibrations, ambient noise, dust, and electrical and mechanical hazards are known to distort the thickness measurements generated by the previously known inspection methods. A systematic method of taking such sources of error into account has not been developed to improve previous inspection methods. As a result, operators are forced to shut down and cool furnaces in order to check the refractory lining from time-to-time.

SUMMARY OF THE INVENTION

According to an aspect of an embodiment of the invention there is provided a system for inspecting a metallurgical furnace wall having: a stress wave generator for generating a stress wave that propagates into a metallurgical furnace wall; a stress wave sensor for sensing reflections of the stress wave; and a processor having computer readable program code means embodied thereon for (i) recording time domain data about the reflections of the stress wave sensed by the stress wave sensor, (ii) converting the time domain data into frequency domain data, and (iii) producing a determination of the condition of the metallurgical furnace wall by combining time domain data, the frequency domain data and a temperature-dependent scaling factor which compensates for the change in velocity of the stress wave and the reflections of the stress wave through a refractory material included in the metallurgical furnace wall.

In some embodiments, the temperature-dependent scaling factor is calculated as a function of a relative change in the modulus of elasticity over a temperature range corresponding to a temperature gradient through the refractory material within an operating metallurgical furnace.

In some embodiments, producing the determination of the condition of the metallurgical furnace wall includes determining the thickness of the metallurgical furnace wall.

In some embodiments, producing the determination of the condition of the metallurgical furnace wall includes determining the thickness of a refractory lining in the metallurgical furnace wall.

In some embodiments, producing the determination of the condition of the metallurgical furnace wall includes determining the presence or absence of defects including delaminations, accretions, cracks and bubbles. In some such embodiments, producing the determination of the condition of the metallurgical furnace wall also includes determining the position of defects including delaminations, accretions, cracks and bubbles.

In some embodiments, the processor further comprises computer readable program code means embodied thereon for including a geometry-dependent velocity scaling-factor in the determination of the condition of the metallurgical furnace wall. In some such embodiments, the refractory material included in the metallurgical furnace is provided in brick form, and the geometry-dependent scaling factor is calculated as a function of the relative dimensions of the refractory bricks.

In some embodiments, the metallurgical furnace wall under inspection is known to include a refractory lining having a plurality of layers, each composed of one type of refractory material, and wherein the processor further includes computer readable program code means embodied thereon for producing a determination of the condition the metallurgical furnace wall using a plurality of temperature-dependent scaling factors, each temperature-dependent scaling factor corresponding to a respective one type of refractory material in the refractory lining. In some such embodiments, each of the plurality of temperature-dependent scaling factors is calculated as a function of a relative change in the modulus of elasticity over a temperature range corresponding to a temperature gradient through the corresponding refractory material. In other embodiments, the processor further comprises computer readable program code means embodied thereon for including a geometry-dependent velocity scaling-factor in the determination of the condition of the metallurgical furnace wall. In very specific embodiments, each layer of the refractory lining is known to include refractory bricks of one type of refractory material and each of the plurality of geometry-dependent scaling factors is calculated as a function of the relative dimensions of the refractory bricks in a respective layer.

According to an aspect of an embodiment of the invention there is provided an apparatus for inspecting a metallurgical furnace wall having: a plurality of stress wave generator-sensor pairs, each pair for generating a stress wave and sensing reflections of the stress wave at point on a metallurgical furnace; and a processor having computer readable program code means embodied thereon for producing a determination of the condition of the metallurgical furnace wall from a combination of time domain data collected by at least one sensor, frequency domain data derived from the time domain data, and a temperature-dependent scaling factor to correct for the change in velocity of the stress wave and the reflections of the stress wave through a refractory material included in the metallurgical furnace wall.

In some embodiments, the temperature-dependent scaling factor is calculated as a function of a relative change in the modulus of elasticity over a temperature range corresponding to a temperature gradient through the refractory material within an operating metallurgical.

In some embodiments, the determination of the condition of the metallurgical furnace wall includes determining the thickness of the metallurgical furnace wall.

In some embodiments, the determination of the condition of the metallurgical furnace wall includes determining the thickness of a refractory lining in the metallurgical furnace wall.

In some embodiments, the determination of the condition of the metallurgical furnace wall includes determining the presence or absence of defects including delaminations, accretions, cracks and bubbles. In some such embodiments, the determination of the condition of the metallurgical furnace wall also includes determining the position of defects including delaminations, accretions, cracks and bubbles.

In some embodiments, the processor further comprises computer readable program code means embodied thereon for including a geometry-dependent velocity scaling-factor in the determination of the condition of the metallurgical furnace wall. In some such embodiments, the refractory material included in the metallurgical furnace is provided in brick form, and the geometry-dependent scaling factor is calculated as a function of the relative dimensions of the refractory bricks.

In some embodiments, the metallurgical furnace wall under inspection is known to include a refractory lining having a plurality of layers, each composed of one type of refractory material, and wherein the processor further includes computer readable program code means embodied thereon for producing a determination of the condition of the metallurgical furnace wall using a plurality of temperature-dependent scaling factors, each temperature-dependent scaling factor corresponding to a respective one type of refractory material in the refractory lining. In some such embodiments, each of the plurality of temperature-dependent scaling factors is calculated as a function of a relative change in the modulus of elasticity over a temperature range corresponding to a temperature gradient through the corresponding refractory material. In other embodiments, the processor further comprises computer readable program code means embodied thereon for including a geometry-dependent velocity scaling-factor in the determination of the condition of the metallurgical furnace wall. In very specific examples, each layer of the refractory lining is known to include refractory bricks of one type of refractory material and each of the plurality of geometry-dependent scaling factors is calculated as a function of the relative dimensions of the refractory bricks in a respective layer.

According to an aspect of an embodiment of the invention there is provided a method of inspecting a metallurgical furnace wall including introducing a stress wave into a metallurgical furnace wall at a point; sensing one or more reflections of the stress wave near the point of introduction of the stress wave into the metallurgical furnace wall; and processing the reflections in the time and frequency domain in combination with a temperature-dependent scaling factor to correct for the change in velocity of the stress wave and the reflections of the stress wave through a refractory material included in the metallurgical furnace wall.

In some embodiments, the temperature-dependent scaling factor is calculated as a function of a relative change in the modulus of elasticity over a temperature range corresponding to a temperature gradient through the refractory material within an operating metallurgical furnace.

In some embodiments, the method further includes determining the thickness of the metallurgical furnace wall.

In some embodiments, the method further includes determining the thickness of a refractory lining in the metallurgical furnace wall.

In some embodiments, the method also includes determining the presence or absence of defects including delaminations, accretions, cracks and bubbles. In more specific embodiments, the method may also include determining the position of defects present in the metallurgical furnace wall.

In some embodiments, the method also includes including a geometry-dependent velocity scaling-factor in the determination of the condition of the metallurgical furnace wall.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Figure 1:
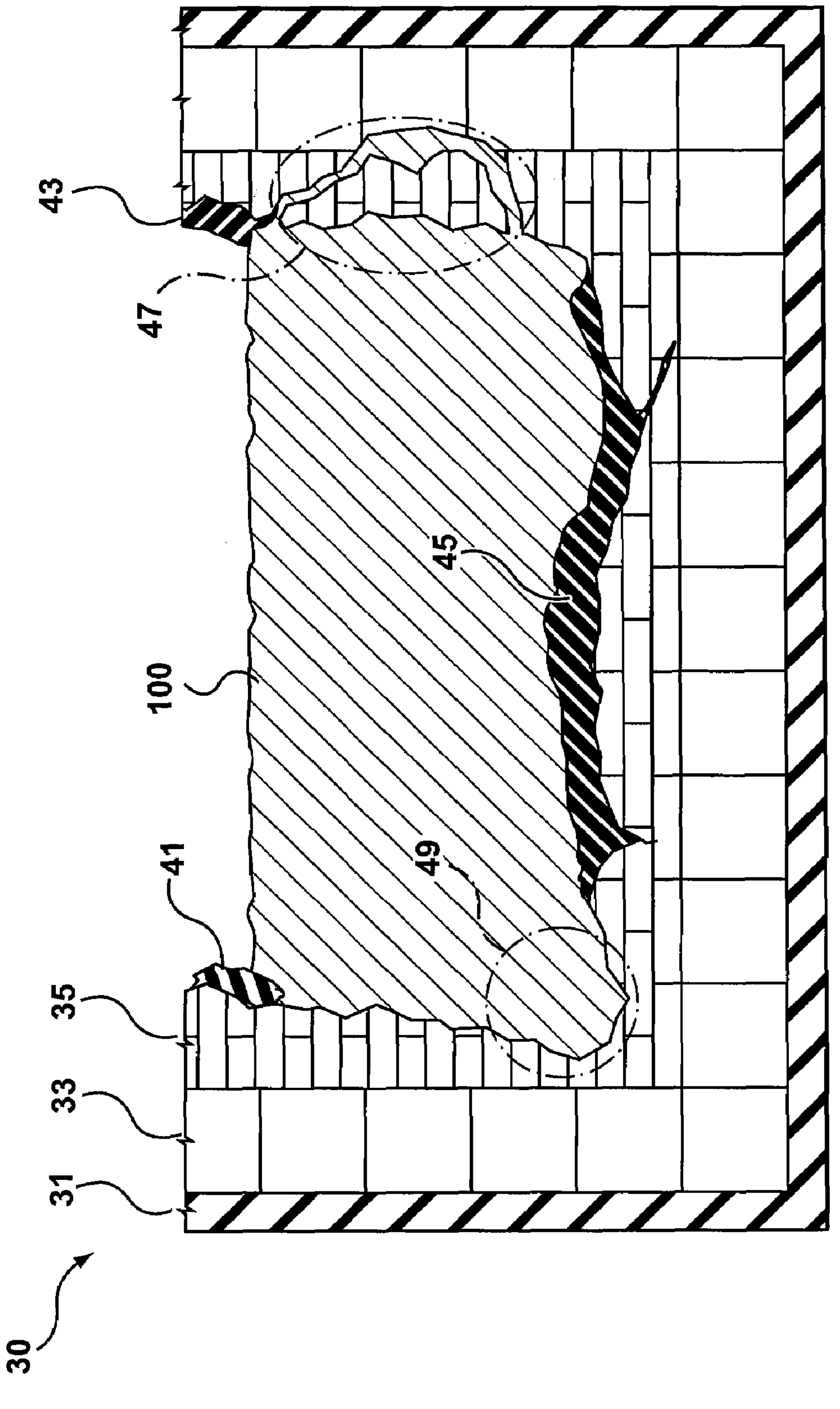
FIG. 1 is a cross-sectional drawing of a simplified example metallurgical furnace.

Inspecting the refractory lining of a metallurgical furnace is a challenging procedure that typically requires emptying, shutting down and cooling the furnace to reliably evaluate the condition of the refractory lining. Shutting down a furnace can cost operators significant amounts in lost revenue, man-hours, and other expenses. In some instances, repetitive cycles of cooling and re-heating, required for routinely shutting down a furnace for inspection, leads to faster deterioration of the refractory lining.

Unfortunately, previously known methods of determining the current condition of a refractory lining, while a metallurgical furnace is running, provide flawed results. The results are flawed because previously known inspection methods rely on quantitative models that are based on unrealistic assumptions about the state of the refractory materials in the furnace. For example, the models previously relied upon do not take into consideration the effects of extremely high temperatures on the refractory material properties. Consequently, thickness measurements have been seen to be off by as much as 30% to 100% using these previously known methods. Thus, in order to avoid expensive and dangerous accidents operators of such furnaces have been forced to routinely shut down their furnaces to reliably evaluate the condition of the refractory lining.

By contrast, some embodiments of the present invention provide systems, methods and apparatus for more accurately determining the thickness of a refractory lining included in an operating metallurgical furnace. In some embodiments a transient propagated stress wave, such as a compressive (i.e. longitudinal, primary, etc.) stress wave, is used to determine the condition of a refractory lining. The reflections of the stress wave are evaluated to identify the presence and position of defects such as, for example, cracks, delaminations and bubbles in the refractory lining in addition to the overall remaining thickness of the refractory lining. In some embodiments, the transient propagated stress wave includes frequencies ranging from the acoustic (i.e. audible) to the ultrasonic (i.e. non-audible). For example, a stress wave generated according to an embodiment of the invention may have a frequency range of 100 Hz to 80 kHz. This range of frequencies can be advantageous in many scenarios since ultrasonic stress waves alone typically lack sufficient energy to pass through thick refractory linings and generally experience rapid attenuation through solid heterogeneous masses.

Additionally, some embodiments of the present invention provide a systematic way to include the affect that temperature has on the velocity of a compressive stress wave through a heated refractory material and/or accretions. As identified in aspects of the present invention, and contrary to the common understanding in the art, the velocity of a stress wave, at each frequency and in a refractory material, is not necessarily constant over a temperature range. In accordance with aspects of some specific embodiments of the invention, a scaling factor $\alpha$ can be calculated for each refractory material to adjust for the presumed velocity of the stress wave through each refractory material. The scaling factor $\alpha$ for a particular refractory material is a function of the modulus of elasticity E and the temperature and/or temperature gradient through that refractory material. In some very specific embodiments, the scaling factor $\alpha$ is calculated as a function of the relative change in the modulus of elasticity E over a temperature range corresponding to the temperature gradient through a layer of one type of refractory material. As will be described in more detail below this is a significant departure from what is known in the art, since a change in the modulus of elasticity E and the corresponding affect on the velocity of a stress wave through a particular refractory material were previously assumed to be non-existent.

The modulus of elasticity for a material E is a quantitative relationship between stress and strain in that material. For metals (e.g. steel, lead, copper, etc.) it is commonly understood that as the temperature increases the deformation behavior of a metal changes from elastic to plastic. Consequently, it is generally considered easier to deform a metal at higher temperatures than at lower temperatures. In other words, less stress induces the same or greater strains within a metal at higher temperatures as compared to at lower temperatures. This relationship between stress and strain is often quantified as the modulus of elasticity E, which is commonly calculated as a ratio of stress to strain. The change in the deformation behavior (from elastic to plastic) is due to the weakening of a metal lattice structure at higher temperatures that in turn allows metal atoms to flow more easily. Eventually, the melting point temperature is reached and a solid metal changes to a liquid. For steel the melting point is approximately 1500° C.

Refractory materials have a very strong lattice structure and high temperatures do not generally cause a refractory material to melt and/or behave in a way that can be categorized as plastic. Refractory materials also tend to be far more brittle than metals. As a result, the melting and deformation characteristics of metals described above are not found in refractory materials. By contrast, refractory materials simply tend to break, crack and/or disintegrate into a powder while remaining in the elastic regime.

In quantitative terms, the modulus of elasticity E of a refractory material does not change significantly as a function of temperature in a way that is comparable to the change observed in metals. In fact, the modulus of elasticity E for a particular refractory material is typically considered to be a constant. Seemingly negligible changes in a modulus of elasticity E were previously not considered to be of importance when considering properties of a refractory material in relation to the intended uses for that refractory material. Despite not having a significant impact on the structural and insulating properties of a refractory material, a relative change in the modulus of elasticity E, as identified as an aspect of the present invention, may have a significant impact on the velocity of a stress wave in the refractory material.

Returning again to the use of stress waves, a shock or impulse disturbance to a solid induces a number of linear and angular displacements within that solid. Specifically, in a refractory material the applied shock or impulse disturbance generates various types of stress waves. Stress waves may be categorized as either body or surface waves. Body waves travel through a solid, whereas surface waves travel primarily along the surface of the solid.

Two significant types of body waves are Primary-waves (i.e. P-waves, longitudinal, compressive waves, etc.) and Secondary-waves (i.e. S-waves, shear waves, etc.). P-waves induce particle motion in the same direction as the path of travel of the wave front. That is, as a P-wave passes through a solid, particles vibrate about an equilibrium position, in the same direction as the P-wave is traveling. P-waves also cause compression and rarefaction, but not rotation of a refractory material. On the other hand, S-waves induce particle motion perpendicular to the path of travel to the wave front. That is, as an S-wave travels through a body, particle displacement is perpendicular to the direction of propagation of the S-wave. S-waves also cause shearing and rotation, but no volume changes of a refractory material.

In many embodiments according to the invention, P-waves and reflections of P-waves are evaluated to determine the condition of a refractory lining of an operating metallurgical furnace. P-waves are generally considered to be the fastest of the stress waves and are known to travel through solids, liquids, and gases. Accordingly, measurements relating to the thickness of a refractory lining and the presence and position of accretions and defects in the refractory lining can be determined using data collected about the propagation of P-waves through the walls of an operating metallurgical furnace irrespective of the state of the matter at any point within the walls. As noted above some embodiments of the invention provide a method by which the effect of temperature on P-wave velocity, through a refractory material included in a furnace wall, can be more accurately considered.

It is generally accepted that the fundamental wave equation (1) is suitable to relate velocity $V_p$ of a P-wave to the frequency f and wavelength λ of the P-wave. The velocity $V_p$ of a P-wave in a particular refractory material and the density ρ of the refractory material can be multiplied together to determine the acoustic impedance Z for that refractory material, as shown in equation (2). The acoustic impedance Z provides a value that is useful in estimating how much energy is reflected from an interface between two materials.

$$V_p = f \times \lambda \tag{1}$$

$$Z = \rho \times V_p \tag{2}$$

However, when used to analyze an operating furnace, equations (1) and (2) produce inaccurate results stemming from assumptions made about the wavelength λ and frequency f of a P-wave in a heated refractory material. The extremely high temperatures inside an operating furnace result in non-linear changes in the wavelength λ and frequency f of a P-wave, which are not accurately observable or observable at all given the hostile working-environment the furnaces are included in. As a result, significant errors are encountered when using previously known methods of inspecting operating metallurgical furnaces.

Alternatively, and in accordance with some embodiments of the invention, the velocity $V_p$ of a P-wave in a refractory material can also be determined from the density ρ and the modulus of elasticity $E_d$ of the refractory material. For example, the velocity $V_p$ of a P-wave through an infinite isotropic elastic refractory solid, with homogeneous composition, can be determined with equation (3). In contrast, equation (4) provides the velocity $V_p$ of a P-wave through refractory rod-shaped structures, where the diameter of the rod is much smaller than the length (i.e. d<<L).

$$V_p = \sqrt{\frac{E_d(1-\upsilon)}{(1+\upsilon)(1-2\upsilon)\rho}} \tag{3}$$

-continued $$V_p = \sqrt{\frac{E_d}{\rho}} \tag{4}$$

In equations (3) and (4), ν is Poisson's ratio, ρ is again the density and $E_d$ is Young's (dynamic) modulus of elasticity for the refractory material.

The velocity of a P-wave through a rod-shaped structure, as given by equation (4), will be less than the velocity of the P-wave through an infinite isotropic solid, as given by (3). Taken together, equations (3) and (4) define respective upper and lower end points for a range of P-wave velocities in homogenous refractory solid structures that fall somewhere between the extremes of a infinite solid mass and a very skinny rod. Although both equations (3) and (4) relate elasticity of a material to velocity, neither take into consideration the temperature of the material.

Some embodiments of the invention provide a velocity scaling-factor α that can be used to correct the velocity of a P-wave in a refractory material in which the modulus of elasticity changes due to extreme heating. In some specific embodiments, the velocity scaling-factor α is calculated as a function of the relative change in the modulus of elasticity $E_d$ over a temperature range corresponding to a temperature gradient through a layer of one type of refractory material. Accordingly, velocity equations (3) and (4) can be re-written as corrected equations (5) and (6), respectively.

$$V_p' = \alpha V_p = \sqrt{\frac{E_d(1-\upsilon)}{(1+\upsilon)(1-2\upsilon)\rho}}\,\alpha \tag{5}$$

$$V_p' = \alpha V_p = \sqrt{\frac{E_d}{\rho}}\,\alpha \tag{6}$$

In one very specific example, if the change in elasticity is linear over a continuous temperature range, the velocity scaling-factor α is given by equation (7).

$$\alpha = 1 + \left(\frac{\int_{T_1}^{T_2} E(T)\,dT}{E_o}\right) = \left(1 + \frac{\Delta E_d}{E_o}\right) = \left(1 + \frac{E_{d2} - E_{d1}}{E_o}\right) \tag{7}$$

The terms $E_{d2}$ and $E_{d1}$ correspond to the elasticity of the refractory material at respective first and second temperatures (e.g. on a hot face and cooler face, respectively, of a refractory brick), whereas $E_o$ corresponds to the elasticity used to first calculate the uncorrected velocity $V_p$, which is likely the room temperature value of $E_d$ available from the manufacturers of refractory materials.

For many refractory materials, the change in elasticity as a function of temperature is generally non-linear and not always easily characterized in an equation as simple as equation (7). In such instances, advanced curve fitting techniques can be used to derive numbers for the integral, shown in equation (7), as required for each type of refractory material. In general, each type of refractory material used in a furnace wall will have a corresponding velocity scaling-factor α. Moreover, many manufacturers do not have accurate elasticity data for refractory materials at high temperatures, since elasticity in such materials is normally assumed to be relatively constant. Accordingly, in many cases testing has to be done to determine elasticity at elevated temperatures in the range of those found in metallurgical furnaces. The tests involve heating the refractory material and measuring either the static or dynamic modulus of elasticity.

Turning to FIG. 1, shown is a cross-sectional drawing of a simplified example metallurgical furnace 30. The metallurgical furnace 30 includes an outer steel shell 31, a first layer of refractory bricks 33 and a second layer of refractory bricks 35. Those skilled in the art will appreciate that some metallurgical furnaces also have a roof (not shown in FIG. 1) that includes an outer steel shell and an inner refractory lining or only a singular refractory layer.

The first layer of refractory bricks 33 is closest to the steel shell 31 and is considered a safety layer. The second layer of refractory bricks 35, in direct contact with the molten material 100, is considered a working layer. In a typical metallurgical furnace the bricks in a safety layer are typically less dense than the bricks in a working layer. However, in some furnaces the reverse may be true or the bricks may be of the same type in each layer. Additionally and/or alternatively, in some furnaces a safety layer is composed of a castable material (e.g. a mixture of sand, concrete, alumina and/or other materials), in contrast to bricks as described above.

The thickness of each of the first and second layers of refractory bricks 33 and 35 is partially dependent on the process the metallurgical furnace is involved in. Generally, the more aggressive the process the thicker the layers are. Thicknesses for refractory linings typically range from 600 mm to 1600 mm.

As shown for illustrative purposes only, molten material 100 (e.g. molten iron ore) is inside the metallurgical furnace 30 and the first and second layers of refractory bricks 33 and 35 have both been deteriorated to some degree. In particular, the second layer of refractory bricks 35 is significantly deteriorated and has a number of defects including accretions 41, 43 and 45, a delamination zone 47, and an area of extreme wear 49.

In the operating metallurgical furnace 30 the accretions 41, 43 and 45 are composed of impurities that have settled out of the molten material 100. Delamination (e.g. delamination 47) occurs when molten material 100 seeps behind bricks of one layer and separates those bricks from the layer behind. Delaminations near the steel shell 31 can be very dangerous, since the steel shell 31 may be exposed to the molten material 100. Areas of extreme wear (e.g. area 49) naturally occur over time as the working layer bricks are wasted away.

The total thickness of a furnace wall at a point is the combination of the remaining portions of refractory brick layers at that point in addition to any accretion on the working layer of the refractory lining at that point plus the thickness of the outer shell. Since deterioration is difficult, if not impossible, to control and/or predict the thickness of the refractory lining is expected to be different at different points. However, at each point the same method can be used to evaluate the thickness of the refractory lining.

According to one specific method provided by an embodiment of the invention, a P-wave is generated by an impact applied to the steel shell 31 of the metallurgical furnace 30. The P-wave travels through the steel shell 31 and through the refractory brick layers 33 and 35. Reflections of the P-wave are created at material interfaces and most notably at the interface between the second layer of refractory bricks 35 and the molten material 100, and the interfaces created by defects (e.g. cracks, delaminations, bubbles and the like). In order to accurately evaluate measurements and reflections of the P-wave a velocity scaling-factor $\alpha$ is determined for each refractory material (e.g. for each refractory brick layer 33 and 35) included in the refractory lining. This method will be described in further detail below with reference to FIGS. 4 and 5.

Figure 2A:
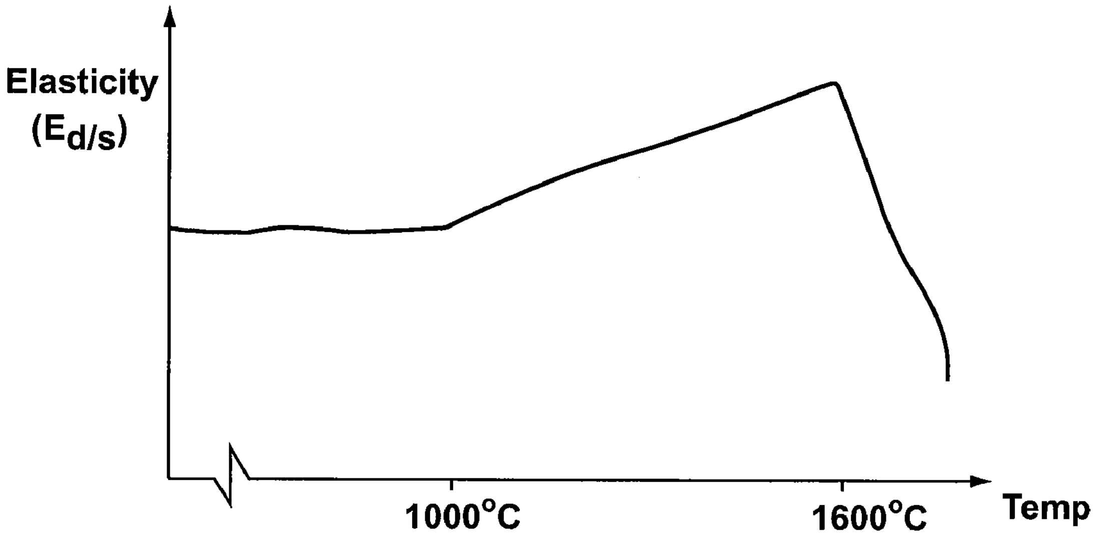
FIG. 2A is a first example graph showing that an elasticity of a refractory material included in the metallurgical furnace of FIG. 1 is temperature dependent.
Figure 2B:
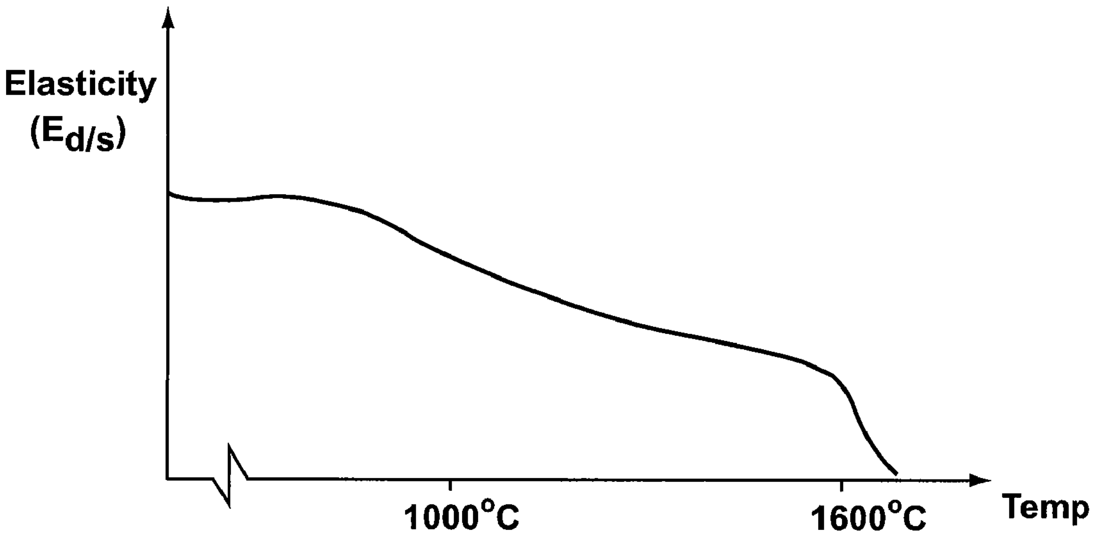
FIG. 2B is a second example graph showing that an elasticity of another refractory material included in the metallurgical furnace of FIG. 1 is temperature dependent.

As noted earlier, the velocity scaling-factor $\alpha$ is calculated as a function of the relative change in the modulus of elasticity over a temperature gradient present in a layer of the refractory material. In some instances, the temperature gradient includes only a single temperature because a particular refractory material heats evenly to the single temperature. On the other hand, in other instances the temperature gradient corresponds to a specific temperature gradient expected in another type of refractory material. FIGS. 2A and 2B graphically illustrate respective first and second examples of how elasticity in the corresponding refractory materials in layers 33 and 35 are temperature dependent.

Figure 3:
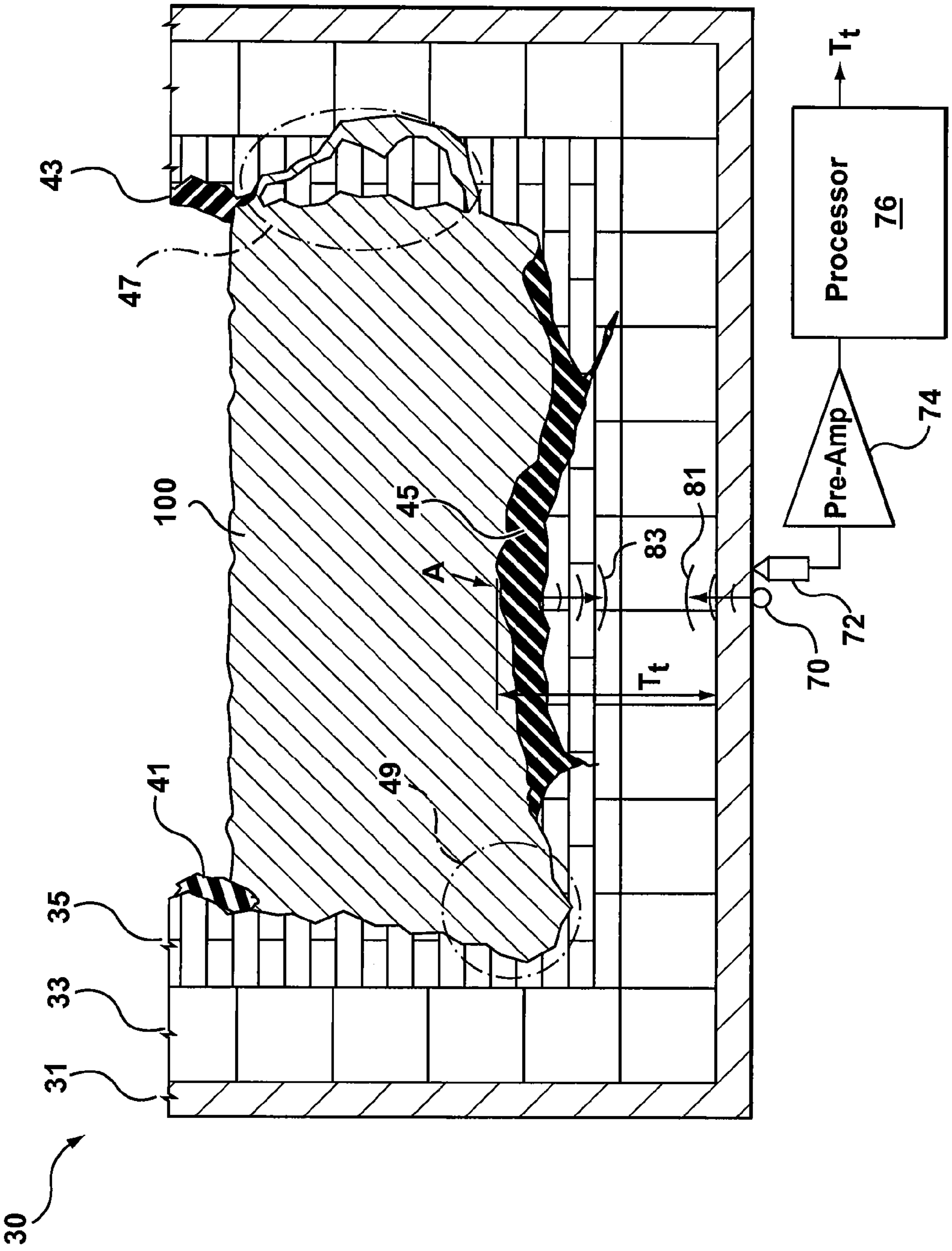
FIG. 3 is a simplified illustration showing a Single-impactor Single-Sensor (SISS) inspection system according to an embodiment of the invention in combination with the metallurgical furnace shown in FIG. 1.
Figure 4:
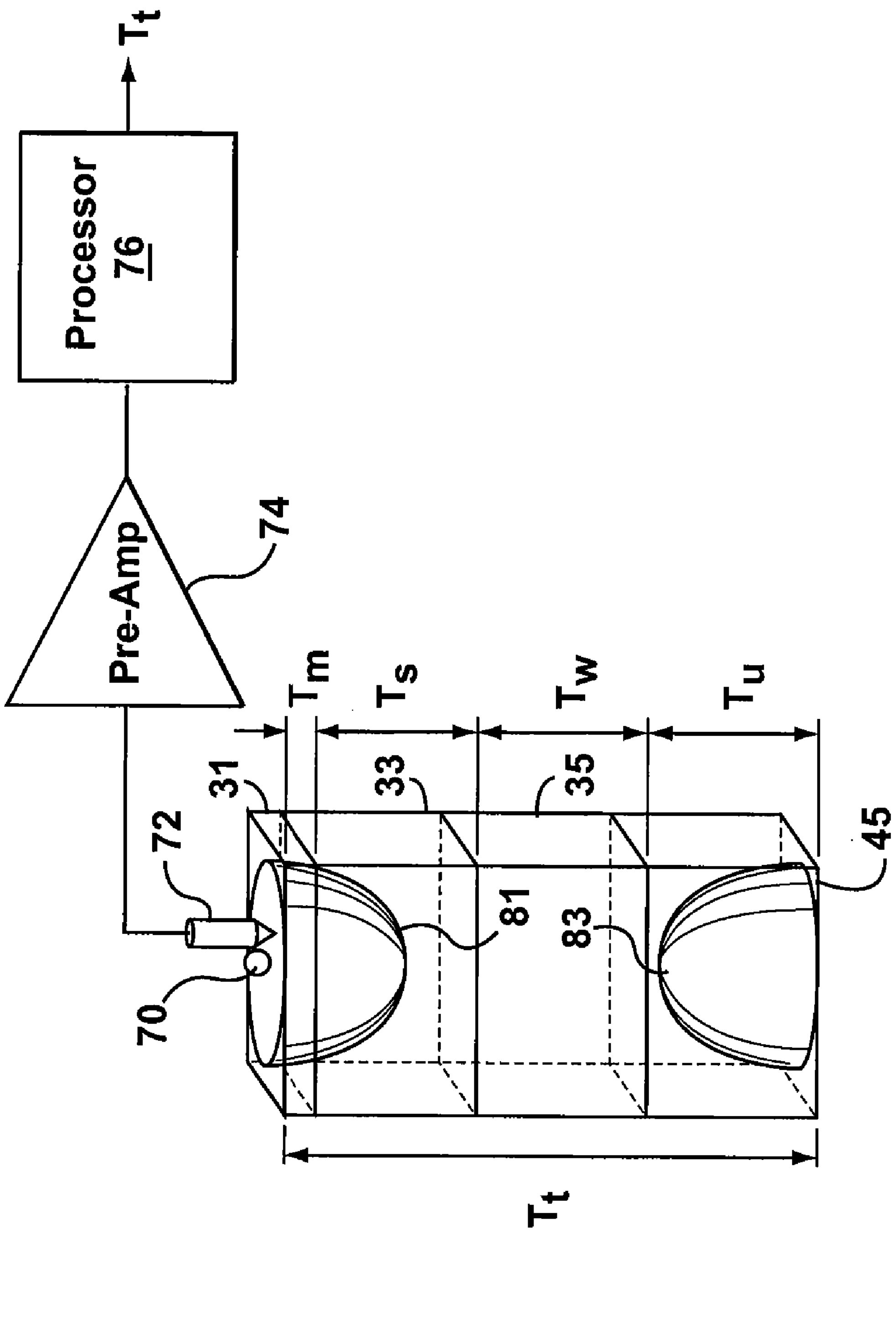
FIG. 4 is a simplified perspective view of a segment through the metallurgical furnace wall directly under an impactor and sensor of the SISS inspection system shown in FIG. 3.

Referring to FIGS. 3 and 4, and with further reference to FIGS. 1 and 2A-2B, shown is a system for determining the condition of a refractory lining in a metallurgical furnace, as provided by a very specific embodiment of the invention. FIG. 3 includes the metallurgical furnace 30 and all of the defects and patterns of deterioration described above with reference to FIG. 1. Accordingly, FIGS. 1 and 3 share common reference indicia for identical features common to both figures.

The system shown in FIGS. 3 and 4 is a Single Impactor Single Sensor (SISS) system because it includes a single impactor 70 and a single sensor 72. The impactor 70 and sensor 72 are placed adjacent to one another. The system also includes a processor 76 and an optional pre-amplifier (Pre-Amp) 74. Those skilled in the art will appreciate that the SISS system also includes a suitable combination of associated structural elements, mechanical systems, hardware, firmware and software that is employed to support the function and operation of the SISS system. Such items may include, without limitation, a power supply, piping, vibration sensors, regulators, seals, insulators and electromechanical controllers.

In some embodiments the sensor 72 is a broadband vertical displacement transducer or a similar device suitable to operate as a stress wave sensor. For example, in other embodiments, accelerometers and like devices are also suitable for use as the sensor 72.

In some embodiments, as illustrated in FIG. 3, the sensor 72 is coupled to provide a signal to the processor 76 through the optional Pre-Amp 74. In alternative embodiments, the sensor 72 is coupled directly to the processor 76. The Pre-Amp 74 operates to amplify the sensor readings of the sensor 72. As described in detail below, the processor 76 operates to evaluate sensor readings received from the Pre-Amp 74 (or directly from the sensor 72) to determine the condition of the refractory lining under the sensor 72. With specific reference to FIG. 4, a measure of the total thickness $T_t$ of the furnace wall under the sensor 72 is the combined thickness of the outer steel shell 31, the first and second refractory brick layers 33 and 35, and the accretion 45.

In some embodiments, the processor 76 includes a computer readable program code means embodied therein for determining a condition of a refractory lining. In some such embodiments the computer readable program code means includes instructions for triggering the impactor 70 to generate a P-wave and evaluating reflections of the P-wave.

The impactor 70 is used to generate a P-wave that is transmitted into the wall of the metallurgical furnace 30 by first striking a point on the outer steel shell 31. That is, the impactor 70 is a device suitable to operate as a stress wave generator. In some embodiments, the impactor 70 is a spherical impactor. Spherical impactors generate simple, easy to analyze spherical P-waves in a broad range of frequencies. In alternative embodiments, P-waves can be generated manually with a mallet (or similar instrument), with controlled electric shocks and/or small explosions.

The frequency range of a P-wave generated by the impactor can be controlled by adjusting at least one of a number of parameters, including, without limitation, the diameter of the contact point of a spherical impactor, the surface smoothness of the outer steel shell 31, the input force and the contact time $t_c$. For example, a P-wave with a relatively high frequency range will be generated if the outer steel shell 31 is smooth, clean and struck with a relatively small-diameter impact source. The highest useful frequency component of a generated P-wave may be estimated from the contact time $t_c$ according equation (8).

$$f_{max} = \frac{1.25}{t_c} \tag{8}$$

The contact time $t_c$ is the duration of time that the impactor 70 connects with the steel shell 31. The contact time $t_c$ can be adjusted to control the generated range of frequencies in a P-wave. Having a relatively broad range of frequencies in a single P-wave is advantageous as wave energy at each frequency is attenuated to different degrees as a function of the materials through which the P-wave travels.

Referring specifically to FIG. 4, an impact results in the generation of a semi-spherical P-wave 81 below the point of impact. Surface waves and S-waves are also generated, however, more of the energy is transmitted via the P-wave 81 directly away from the impactor 70. The P-wave 81 propagates away from the impactor 70 until it encounters acoustic interfaces (boundaries) or fades away due to attenuation through the furnace.

In general, when a P-wave encounters an acoustic interface, depending on the material properties of the acoustic interface, either the entire wave or part of the wave reflects back towards the source of impact. If a second material has significantly lower acoustic impedance than a first material from which a P-wave originates (e.g. refractory to gas or refractory to liquid interfaces), then a significant portion of the P-wave reflects back in the direction it started from. Such an interface is called a stress free interface. On the other hand, if the second material has significantly higher acoustic impedance than the first material, part of the P-wave reflects back and the other part continues to propagate into the second material. A small portion of the propagating P-wave in the second material refracts along the interface and another small portion of the propagating P-wave is converted into waveforms (e.g. surface waves and S-waves). Reflections bounce back and forth between acoustic interfaces, naturally attenuated as they travel through a material, until the energy more-or-less completely fades away. If the two materials have similar acoustic impedances then the amount of the reflection is small and natural attenuation from the materials tends to fade the reflection out of existence before the reflection reaches the original impact/sensor point.

Each interface between adjacent layers (e.g. between layers 35 and 45 in FIG. 4) can be considered a respective acoustic interface, since each layer likely has an acoustic-impedance that is different from those of the layers adjacent to it. Despite this, reflections from interfaces between refractory layers (e.g. 33 and 35) do not tend to produce significant reflections unless defects are present. When the propagating P-wave 81 encounters an acoustic interface, it goes through reflection, refraction, diffraction and mode conversion. In many embodiments of the invention effects stemming from refraction, diffraction and mode conversion are not given significant consideration, whereas reflections are considered in greater detail.

The sensor 72 is arranged to sense reflections, indicated for example by a single semi-spherical P-wave reflection 83 in FIG. 4, as they arrive back to the impact source. The reflection arrivals are almost periodic and relate to the velocity of the P-wave 81 in the refractory lining and the total path length of the P-wave 81 (and reflection 83), which is twice the total thickness $T_t$ of the furnace wall. Moreover, the duration between two successive reflection arrivals is an estimate of how long the P-wave 81 and a corresponding reflection 83 took to travel through a corresponding layer in the furnace wall. In order to simplify the model, the velocity scaling-factor α for each layer of refractory material is only applied to the uncorrected velocity $V_p$ of the P-wave 81 in that particular refractory material. Accordingly, equation (9) provides an estimate of a time during which a P-wave travels in a given refractory layer n.

$$t_{pn} = \frac{2T_n}{V_{pn}} \tag{9}$$

The term $T_n$ is the thickness of a particular refractory layer n, $V_{pn}$ is the uncorrected velocity, and $t_{pn}$ is one specific duration of time between reflection arrivals. The time $t_{pn}$ can be considered as the period between reflections 83. Given that the reciprocal of a period is a corresponding frequency, equation (9) can be written in terms of frequency of reflections as shown in equation (10).

$$f_{pn} = \frac{V_{pn}}{2T_n} \tag{10}$$

The reflections 83, taken collectively, form a time domain acousto-ultrasonic echo response of the furnace wall to the P-wave 81 generated by the impactor 70. The time domain acousto-ultrasonic echo response can be converted into corresponding a frequency domain acousto-ultrasonic echo response using a Fast Fourier Transform (FFT) method or another (and likely less efficient) digital signaling processing technique by the processor 76. In some embodiments, the processor 76 has access to a computer readable medium having instructions for carrying out an FFT method or another digital signal processing method for converting between the time and frequency domains. The frequency domain acousto-ultrasonic echo response shows the effect that successive reflection arrivals have on the surface of the outer steel shell 31.

However, before equations (9) and (10) can be used, in accordance with a very specific embodiment of the invention, the velocity $V_p$ of the P-wave 81 and corresponding reflection 83 in each refractory material is corrected by applying the aforementioned velocity scaling factor $\alpha_n$, for each corresponding refractory material n.

The wave speed generated by the impact source is an indirect measurement of the P-wave speed. An impact source causes multiple reflections of the P-waves causing excitation of a particular mode of vibration. This mode of vibration is called thickness mode of vibration and results in alternating expansions and contractions across the thickness of the object. Numerous finite element and laboratory experimentations, covering a wide range of shapes and dimensions for the solids were used to determine the first mode of vibration generated by an impactor. This first mode of vibration or fundamental frequency affects the P-wave speed and is called β. That is, a second geometry-dependent velocity scaling-factor $\beta_n$ may also optionally be applied for each refractory material n in order to improve the accuracy of the thickness and/or defect identification measurements obtained. The shape and dimensions of a refractory brick have an affect on the velocity $V_p$ of a P-wave through the refractory brick. In order to correct for these geometry-dependent effects, a second velocity scaling-factor β may be determined as a function of the relative dimensional ratio of a typical refractory brick within each of the refractory brick layers 33 and 35.

In one specific embodiment, β is 0.96 for length-to-width ratios over 2.0 and ranges between 0.90 and 0.96 for length-to-width ratios between 1.0 and 2.0. The precise values for β can be determined on bricks at room temperature. If a refractory layer includes bricks of different shapes, then each shape should be considered.

In some embodiments, the processor has access to a computer readable medium having instructions for determining the uncorrected velocities and scaling factors for each refractory material. In one specific embodiment, the thickness of a refractory lining including only one type of refractory material (i.e. one refractory layer) can be calculated according to equation (11) as follows.

$$T = \frac{\alpha\beta V_p}{2f_p} \tag{11}$$

Alternatively, if the refractory lining includes multiple layers of different refractory materials (as shown in FIG. 4), the thickness equation becomes more complex and is easier to solve in the frequency domain. Since each refractory layer contains bricks of different composition and thickness, the P-wave velocity through each layer can now be taken into consideration in the overall assessment of the furnace wall. Subsequently, equation (11) is changed and takes the form of equation (12).

$$f_t = \frac{1}{\frac{2T_1}{\alpha_1\beta_1 V_{p1}} + \frac{2T_2}{\alpha_2\beta_2 V_{p2}} + \frac{2T_3}{\alpha_3\beta_3 V_{p3}} + \dots} \tag{12}$$

where $f_t$ is the P-wave thickness frequency of the refractory layers, $V_{p1}$ is the P-wave velocity in the material of layer 1, $T_1$ is the thickness of layer 1, $V_{p2}$ is the P-wave velocity in the material of layer 2, $T_2$ is the thickness of layer 2, and so forth.

Figure 5:
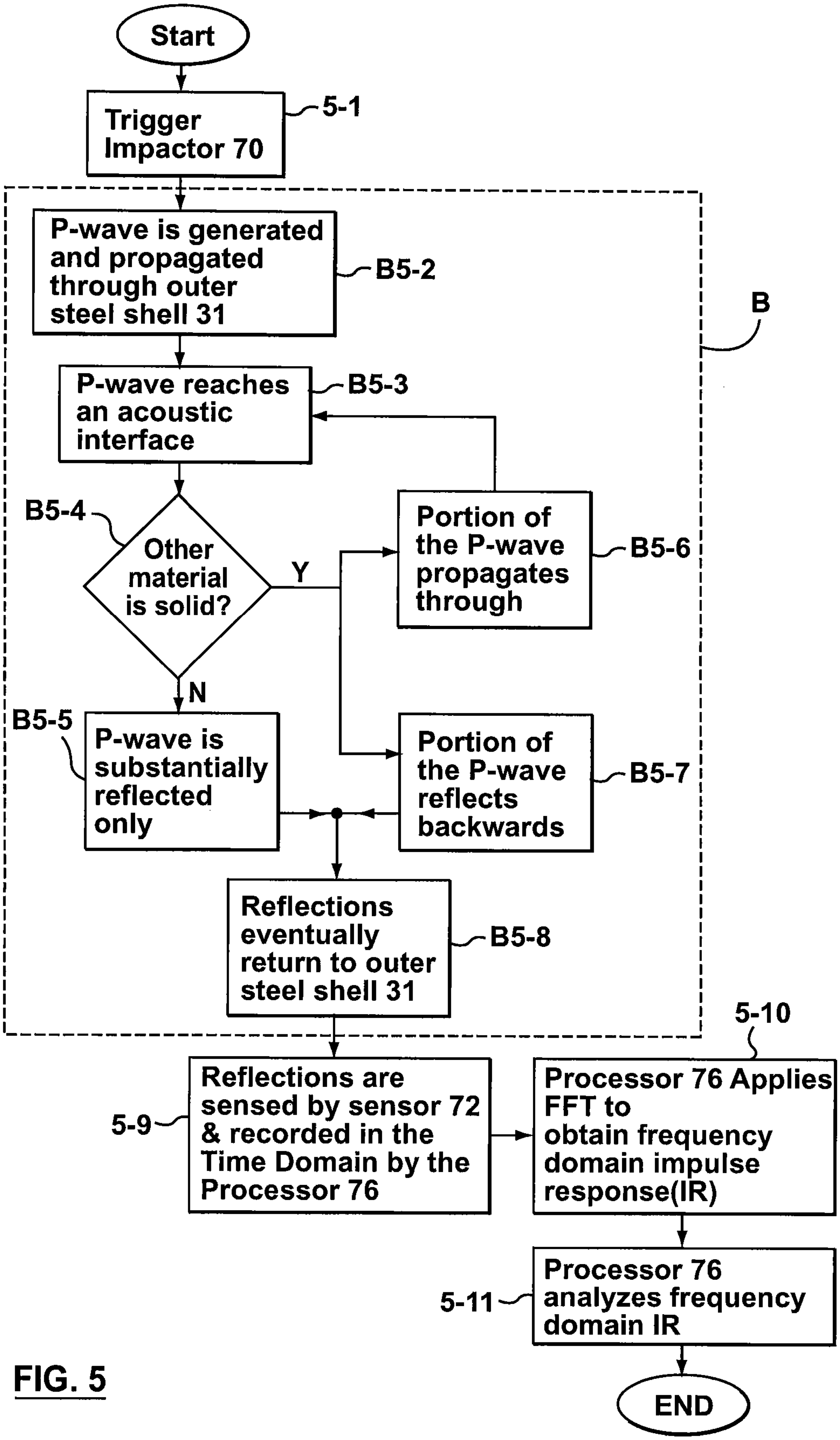
FIG. 5 is a flow chart illustrating one very specific example method according to an embodiment of the invention for use with the SISS inspection system shown in FIG. 3.

Referring to FIG. 5, and with continued reference to FIG. 4, a flow chart illustrating one very specific example method according to an embodiment of the invention is provided. A number of steps in FIG. 5 are collectively assigned a prefix "B" because these particular steps have been provided to illustratively describe, in simplified discrete steps, what is happening to a P-wave as it travels through a furnace wall. These steps generally cannot be controlled after the P-wave is created. Those skilled in the art will appreciate that an actual sequence of events relating to a propagating P-wave is somewhat more complex.

At step 5-1 the impactor 70 is triggered to generate the P-wave 81 on the outer surface of the outer steel shell 31. Consequently, at step B5-2 the P-wave 81 propagates through the outer steel shell 31. At step B5-3, the P-wave reaches an acoustic interface that may be representative of the first refractory layer of bricks 33, the molten material 100 or a defect as described above.

At step B5-4, if the material at the acoustic interface is the molten material (no path, step B5-4), then most of the P-wave 81 is reflected backwards towards the sensor 72. The rest is lost into the molten material 100. On the other hand, if the material at the acoustic interface is a solid (e.g. the first refractory layer of bricks 33), then (yes path, step B5-4) a portion of the P-wave 81 continues to propagate away from the impactor 70 at step B5-6 and another portion of the P-wave 81 reflects back towards the impactor 70 at step B5-7. Following step B5-6 the P-wave 81 continues to repeat through steps B5-3, B5-4 and so on until the wave energy finally completely fades away. The reflections 83 produced at steps B5-5 and B5-7 eventually reach the outer steel shell 31, at step B5-8, after reflections, refractions, diffractions, and mode conversions of their own.

At step 5-9, the sensor 72 senses the reflections 83 as they arrive over time and the processor 76 records the arrival time and magnitude of each reflection. This data forms the time domain acousto-ultrasonic echo response of the furnace wall to the P-wave 81. After the reflections measurements have been made the processor 76 converts the time domain acousto-ultrasonic echo response to a frequency domain acousto-ultrasonic echo response at step 5-10. The frequency domain acousto-ultrasonic echo response is evaluated, as in equations (9) and (12) to determine the condition of the refractory lining, taking into consideration the uncorrected velocities and scaling factors described above, which can be calculated a priori.

Figure 6:
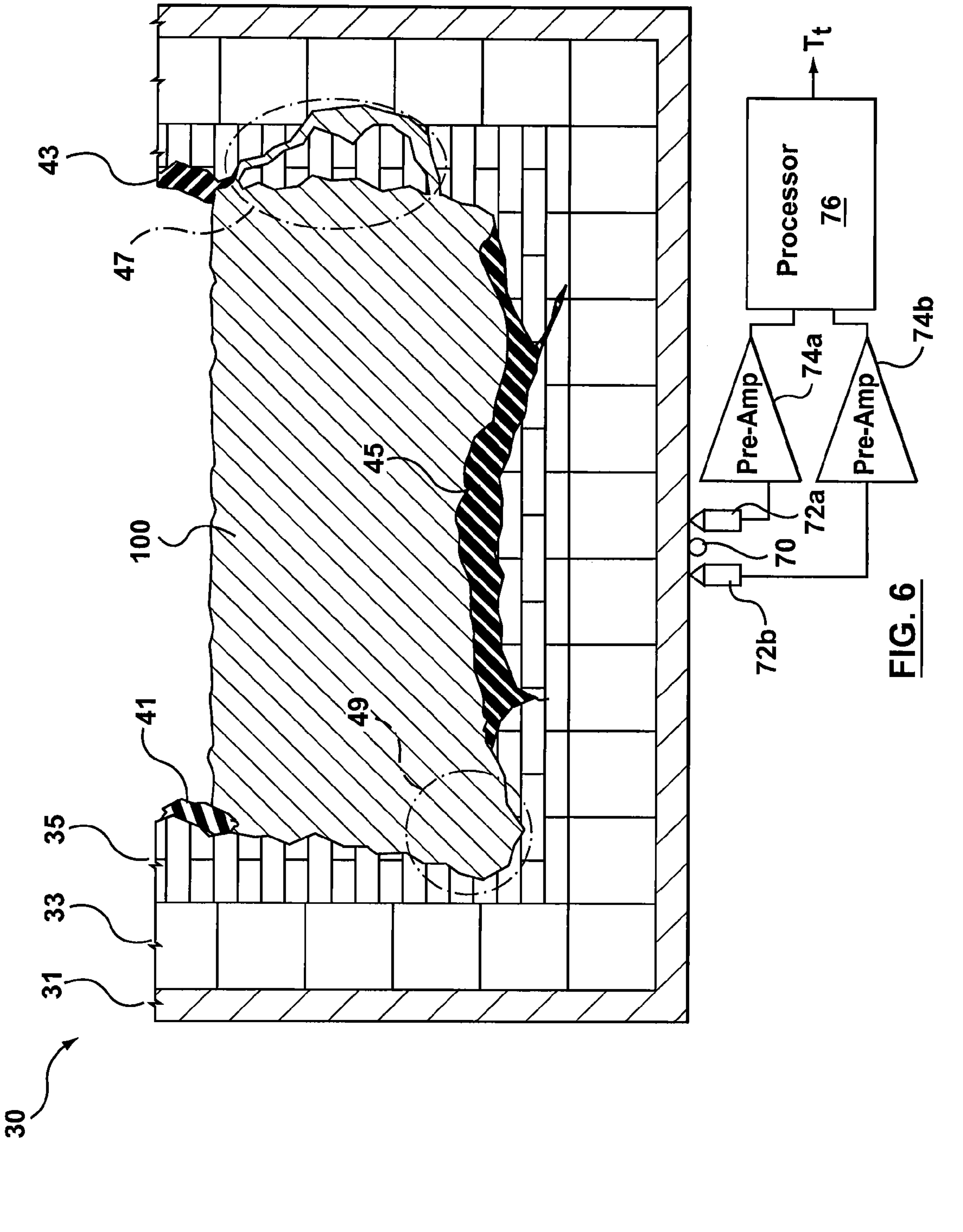
FIG. 6 is a simplified illustration showing a Single-Impactor Multiple-Sensor (SIMS) inspection system according to another embodiment of the invention in combination with the metallurgical furnace shown in FIG. 1.

A simplified illustration showing a Single-Impactor Multiple-Sensor (SIMS) non-destructive and non-invasive inspection system according to another embodiment is provided in FIG. 6. The SIMS shown in FIG. 6 is similar to the SISS shown in FIG. 3. FIG. 6 also includes the metallurgical furnace 30 and all of the defects and patterns of deterioration described above with reference to FIG. 1. Accordingly, FIGS. 1, 3 and 6 share common reference indicia for identical features common to all three figures.

The SIMS system shown in FIG. 6 includes the single impactor 70 as described for the SISS system in FIG. 3. However, instead of a single sensor and a single optional Pre-Amp, the SIMS system includes two sensors *72a,b* and two corresponding optional Pre-Amps *74a,b*. That is, the two sensors *72a,b* are optionally coupled to the processor 76 through the two corresponding Pre-Amps *74a,b*, respectively The sensors *72a,b* are placed adjacent to the impactor 70, and, in operation measurements obtained from the two sensors *72a,b* are averaged, correlated and/or integrated together. Again, velocity scaling-factors are advantageously employed as described above. Those skilled in the art would appreciate that the processor may have access to a computer readable program code means having instructions for combining the measurements from the two sensors *72a,b*.

Figure 7:
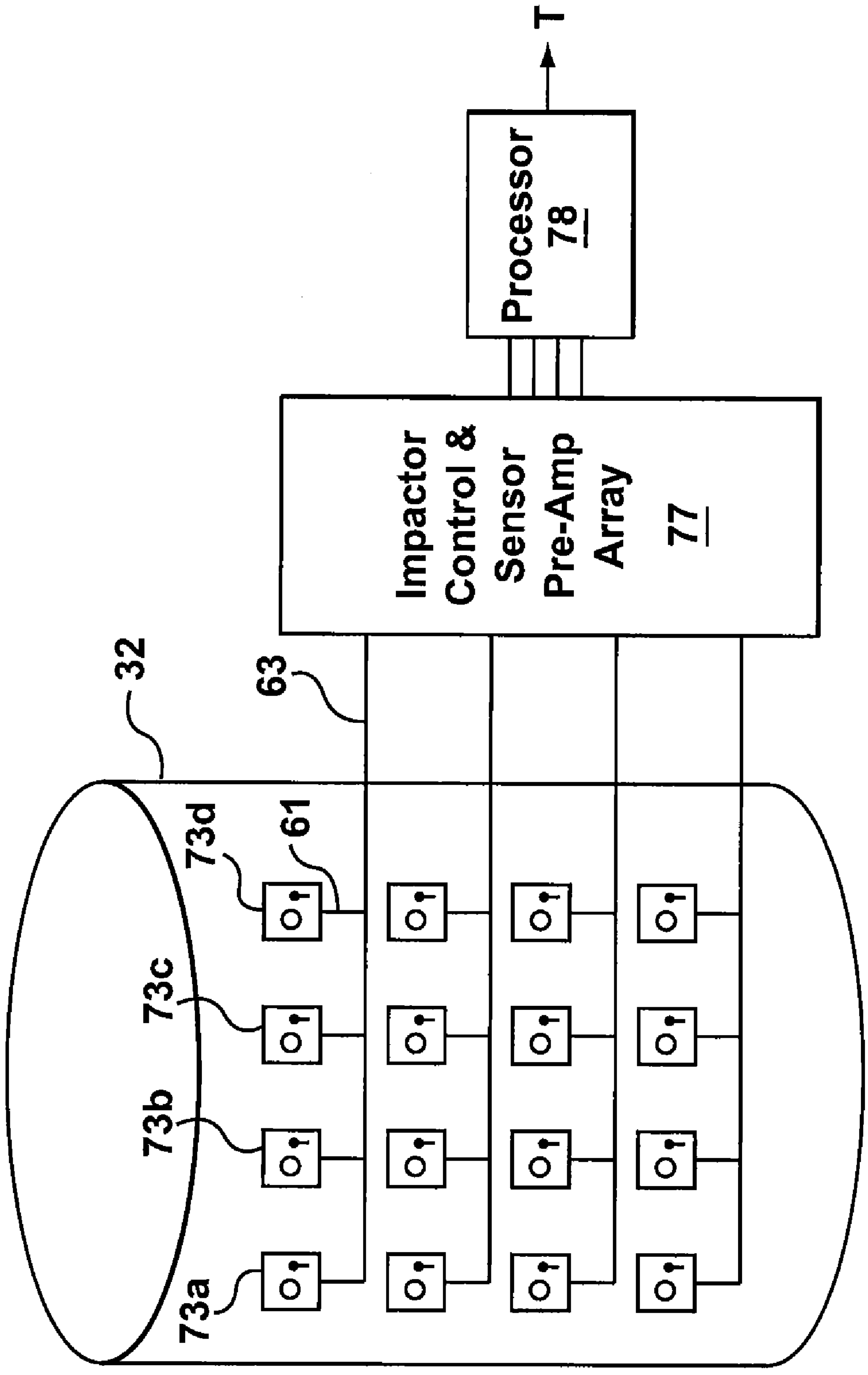
FIG. 7 is a simplified schematic drawing of a Multiple-Impactor Multiple-Sensor (MIMS) inspection system according to yet another embodiment of the invention.

In yet another embodiment, a simplified schematic drawing of a Multiple-Impactor Multiple-Sensor (MIMS) non-destructive and non-invasive inspection system is provided in FIG. 7 in combination with a metallurgical furnace 32. The MIMS, shown in FIG. 7, includes a number of sensor-impactor pairs, indicated for example by *73a*, *73b*, *73c* and *74d*, that are arranged around the surface of the metallurgical furnace 32. The MIMS system also includes an impactor control and sensor Pre-Amp array 77 and a processor 78. Each of the sensor-impactor pairs is coupled to the processor 78 via the impactor control and sensor Pre-Amp array 77. Specifically, as an illustrative example the sensor-impactor pair 73*d* is coupled to the impactor control and sensor Pre-Amp array 77 by a I/O line 61 that branches from a I/O bus 63 connected to the impactor control and sensor Pre-Amp array 77.

In operation, individual impactors may be triggered one at a time, in groups or all together. Each impactor can be arranged and triggered to generate a respective P-wave that has a specific range of frequencies that may or may not be different from the P-waves generated by other impactors included in the MIMS system. Those skilled in the art would appreciate that the impactor control and sensor Pre-Amp array 77 and/or processor 78 may have access to a computer program readable code means having instructions for combining the measurements Similarly, the individual sensors may be used to collect P-wave data from the impactors they are paired with and/or one or more impactors in the MIMS system. Accordingly, reflection measurements collected from one or more of the sensors can be averaged, correlated and/or integrated together. Again, velocity scaling-factors are advantageously employed as described above. Those skilled in the art would appreciate that the processor 78 may have access to a computer program readable code means having instructions for combining the measurements.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention. Numerous modifications and variations of the present invention are possible in light of the above teachings. It is therefore to be understood that within the scope of the appended claims, the invention may be practiced otherwise than as specifically described herein.

I claim:

1. A method of inspecting a metallurgical furnace wall comprising:

introducing a stress wave into a metallurgical furnace wall at a point;

sensing one or more reflections of the stress wave near the point of introduction of the stress wave into the metallurgical furnace wall; and processing the reflections in the time and frequency domain in combination with a temperature-dependent scaling factor to correct for the change in velocity of the stress wave and the reflections of the stress wave through a refractory material included in the metallurgical furnace wall.

2. A method according to claim 1, wherein the temperature-dependent scaling factor is calculated as a function of a relative change in the modulus of elasticity over a temperature range corresponding to a temperature gradient through the refractory material within an operating metallurgical furnace.

3. A method according to claim 1, further comprising determining the thickness of the metallurgical furnace wall.

4. A method according to claim 1, further comprising determining the thickness of a refractory lining in the metallurgical furnace wall.

5. A method according to claim 1, further comprising determining the presence or absence of defects including delaminations, accretions, cracks and bubbles.

6. A system according to claim 5, further comprising determining the position of defects present in the metallurgical furnace wall.

7. A method according to claim 1, further comprising amplifying sensed reflections before processing.

8. A method according to claim 1, further comprising including a geometry-dependent velocity scaling-factor in the determination of the condition of the metallurgical furnace wall.

9. A method of inspecting a vessel wall comprising:

introducing a stress wave into a vessel wall at a point;

sensing one or more reflections of the stress wave near the point of introduction of the stress wave into the vessel wall; and processing the reflections in the time and frequency domain in combination with a temperature-dependent scaling factor to correct for the change in velocity of the stress wave and the reflections of the stress wave through a refractory material included in the vessel wall.

10. A method according to claim 9, wherein the temperature-dependent scaling factor is calculated as a function of a relative change in the modulus of elasticity over a temperature range corresponding to a temperature gradient through the refractory material within an operating metallurgical furnace.

11. A method according to claim 9, further comprising determining the thickness of the vessel wall.

12. A method according to claim 9, further comprising determining the thickness of a refractory lining in the vessel wall.

13. A method according to claim 9, further comprising determining the presence or absence of defects including delaminations, accretions, cracks and bubbles.

14. A system according to claim 13, further comprising determining the position of defects present in the vessel wall.

15. A method according to claim 9, further comprising amplifying sensed reflections before processing.

16. A method according to claim 9, further comprising including a geometry-dependent velocity scaling-factor in the determination of the condition of the vessel wall.

* * * * *